United States Patent [19]
Van Brunt et al.

[11] Patent Number: 5,412,697
[45] Date of Patent: May 2, 1995

[54] DELAY LINE SEPARATOR FOR DATA BUS

[75] Inventors: Roger Van Brunt, San Francisco; Florin Oprescu, Sunnyvale, both of Calif.

[73] Assignee: Apple Computer, Inc., Cupertino, Calif.

[21] Appl. No.: 4,441

[22] Filed: Jan. 14, 1993

[51] Int. Cl.$^6$ .......................... H04L 7/02; H03D 3/24
[52] U.S. Cl. ..................... 375/360; 375/376; 327/98; 327/284
[58] Field of Search ............... 375/110, 120, 118, 119; 328/139, 63, 108, 136, 55, 72; 307/350, 354, 269, 590, 601, 602

[56]  References Cited
U.S. PATENT DOCUMENTS

| | | | |
|---|---|---|---|
| 4,435,687 | 3/1984 | Nadan et al. | 37/110 |
| 4,513,427 | 4/1985 | Borriello et al. | 375/110 |
| 4,805,197 | 2/1989 | Van Der Jagt et al. | 375/110 |
| 4,841,551 | 6/1989 | Avaneas | 375/110 |

FOREIGN PATENT DOCUMENTS

| | | |
|---|---|---|
| 0126384 | 5/1983 | European Pat. Off. . |
| 257253 | 6/1986 | Japan ................. 375/110 |

Primary Examiner—Stephen Chin
Assistant Examiner—Tesfacdet Bocure
Attorney, Agent, or Firm—Blakely, Sokoloff, Talor & Zafman

[57] ABSTRACT

The delay line separator extracts a clock signal from a combined data/clock encoded signal received over a serial data bus, despite the presence of significant duty cycle distortion. Such distortion affects the width of symbols within received data packets but does not affect the timing between successive rising edges within the received pulse string. To extract the clock signal from the distorted signal, the separator exploits a pre-filter circuit which generates 20-nanosecond pulses synchronized with each rising edge in the received signal. A 20-nanosecond pulse train is transmitted down a delay line having twelve delay elements. Circuits are connected to every other delay element within the delay line for generating 10-nanosecond pulses, synchronized with each rising edge of the pulse train. Outputs from the circuits are combined using an OR gate to yield a 10-nanosecond clock signal. The pre-filter generates 20-nanosecond pulses, rather than 10-nanosecond pulses, to ensure that the pulses successfully propagate the entire length of the delay line, despite the presence of significant dispersion within each delay element. Additional circuits are tapped into the delay elements, as desired, to generate additional clock signals delayed by 5- or 10-nanosecond intervals.

49 Claims, 8 Drawing Sheets

DELAY LINE SEPARATOR FOR DATA BUS

BACKGROUND OF THE INVENTION

1. Field of the Invention

The present invention generally relates to serial data bus communication systems and in particular to delay line separators for extracting a clock signal from a combined clock/data encoded input signal received from a serial data bus line.

2. Description of Related Art

Serial backplane data bus systems for transmitting data from one computer to another, or from one computer to a peripheral, often employ only a single communication line. With a single data line transmission, clock information and data information are combined in single packets of information. To accurately extract the data from the signal, the receiving bus system must be capable of first extracting a clock signal from the combined signal. Once the clock signal is extracted, the clock signal is used to sample the received signal to extract data.

A variety of conventional encoding schemes are employed to send combined clock and data transmissions over a single data line. Examples are Manchester, 4B5B and 8B10B. Transmissions encoded in, for example, binary 4B5B encodes 4 bits of data in 5 NRZ binary symbols. The purpose of the encoding is to guarantee both a dc balanced signal and enough transitions for clock extraction circuits to be able to extract the clock. A typical sequence of symbols within a transmitted signal is shown in FIG. 1. As can be seen, each symbol of the transmitted signal fills a bit cell, for 40 megabit 4B5B data, the symbol rate is 50 Mbaud and the bit cell is 20 nanoseconds.

To decode the 4B5B packet to extract the transmitted data, a clock signal encoded within the data packet must first be extracted. A wide variety of techniques has been developed for determining the bit cell width of a received packet of information to determine the clock frequency, as well as the clock signal starting point. One typical technique employs a phase-lock loop for extracting the clock from the received packet. Although a phase-lock loop technique is effective for certain types of serial data bus transmissions, a phase-lock loop is not effective for a data bus that transmits data in short packets (burst mode) followed by long periods of idle in which no clock is present, such as IEEE 1394 Serial Bus. A phase-lock loop is ineffective because the phase-lock loop requires considerable time to acquire a lock on an incoming signal. Thus, with short high speed data bursts, a substantial portion of an input packet of information may be lost merely acquiring a phase lock before any data can be read. Moreover phase-lock loop techniques are analog closed-loop architectures which can have instabilities and noise problems.

In view of these disadvantages to phase-lock loop techniques, modern serial data bus receivers employ other techniques for extracting a clock signal from a combined clock/data input packet. One alternative technique employs a delay line which includes a series of delay elements arranged in series, each receiving a portion of the received packet of data.

A number of different types of noise or distortion can affect a packet as it is transmitted over a serial data bus. Of particular interest to short range, high speed data burst transmissions is a systematic distortion which uniformly varies the duty cycle of the symbols within the data packet. Referring again to FIG. 1, a symbol within a transmitted signal is bounded by a rising edge and a sharp falling edge and has a width equal to the bit cell, typically 20 nanoseconds for 50 Mbaud 4B5B. However, during transmission of the packet, a pulse corresponding to a single symbol is broadened or narrowed, such that the time between a rising edge and a succeeding falling edge is increased or decreased. Such a systematic error is represented in FIG. 1 by the received signal, which includes rising edges advanced by one or two nanoseconds and falling edges delayed by one or two nanoseconds. With such distortion, each high symbol is broadened and spacing between high symbols is decreased. Thus, whereas the bit cell width of the transmitted signal is easily determined from the time between rising and falling edges, the bit cell width cannot be easily determined from the time between rising and falling edges of the received signal. Although shown as broadening each signal, systematic distortion of the kind described can also narrow each symbol, thus broadening spacing between low symbols. The amount of broadening or narrowing of symbols can be quite significant, often resulting in an initial 20 nanosecond symbol being expanded to a width of 30 nanoseconds or narrowed to a width of 10 nanoseconds.

A unique feature of the systematic distortion is that the distance between successive rising edges is unaffected by the distortion. This is true because the source of the distortion affects each symbol pulse in the same manner and by the same amount such that all rising edges are advanced or delayed by a certain amount and all falling edges are advanced or delayed by a certain amount. Such systematic distortion is commonly referred to as duty-cycle distortion and may arise from a rise/fall time mismatch or from offsets in the receiver. Other types of distortion, which do not preserve the time between successive rising edges, include external noise, transient noise and inter-symbol interference. However, during transmission and reception of the packet, the symbol pulse widths are distorted such that high symbol pulse widths are increased (decreased) while low symbol pulse widths are correspondingly decreased (increased) by the same amount. This distortion may vary from packet to packet but does not vary during a packet transmission. The amount of broadening and narrowing of the symbols can be quite significant, often resulting in an initial 20 nanosecond symbol bit cell being expanded to a width of 30 nanoseconds while the opposite value symbol is decreased to 10 nanoseconds.

Heretofore, no effective delay line techniques have been developed which allow the extraction of a clock signal from a high speed clock/data burst in the presence of significant duty-cycle distortion. Techniques which have addressed the problem are either not sufficiently effective in extracting the clock signal or are complex, thus rendering the system expensive.

SUMMARY OF THE INVENTION

From the foregoing, it can be appreciated that there is a need to provide an improved delay line separator for processing high speed bursts of combined clock/data packets received along a serial data bus line to extract the clock signal from the received signal, particularly in circumstances when the transmitted signal is subject to systematic duty-cycle distortion. Therefore, it is an object of the invention to provide an improved delay line architecture for use in extracting a clock signal from a combined data/clock input signal received along a high speed serial data bus. It is a further object to provide an improved delay line architecture, satisfying the above-stated criterion and using a limited number of components, thereby minimizing costs and improving reliability. It is a further object of the invention to provide such a delay line architecture, particularly configured for receiving IEEE 4B5B encoded clock/data signals at a rate of up to 400 megabytes over relatively short transmission lines.

These and other objects of the invention are achieved by a delay line separator for extracting a clock signal from a combined clock/data signal received along a serial data line with the combined signal including pulses bounded by signal level transitions of first and second types, such as rising and falling edges. The improved separator comprises: a one-shot pulse means, connected to said serial data line, for generating a pulse signal having individual pulses corresponding to all transitions of said first type within the data signal; a pulse stretching means for increasing the width of the pulses within the pulse signal; and a delay line means for generating a clock signal from the pulse signal with the clock signal synchronized with the transitions of the first type within the data signal. For purposes of the following descriptions, the transitions of the first type will be rising edge signal level transitions with the transitions of the second type being falling edge signal level transitions. Clearly a design using the opposite edge assignment is also reasonable.

Preferably, the delay line includes: a plurality of additional one-shot pulse means, sequentially connected to the pulse stretching means, for receiving the pulse signal and for generating additional pulses corresponding to the transitions of the first type in the pulse signal, with each of said additional one-shot pulse means consisting of an OR gate with one input inverted connected to two taps of the delay line delayed from each other by a preselected amount; and an OR-gate means connected to each of the additional one-shot pulse means, for combining output pulses from each of the additional one-shot pulse means to yield a single clock signal. The combined signal includes a plurality of sequential bit cells with the combined signal encoded subject to an encoding scheme which ensures at least that transitions of the first type are never more than N bit cells apart. The delay line includes N one-shot pulse means.

With this architecture, the initial one-shot pulse means generates a short pulse synchronized with each rising edge in the input signal. The pulse is no longer than the minimum pulse width received, but preferably not much shorter than the minimum, e.g., half a bit cell—10 nanoseconds. The pulse stretching means expands the initial one-shot pulses to the bit cell time, 20 nanoseconds. The 20 nanosecond pulses are transmitted into the delay line means, which includes a number of sequentially arranged one-shot pulse means, each separated by delay elements. The delay elements ensure that successive one-shot pulse means within the delay line each receive the initial 20-nanosecond pulses delayed by a predetermined amount of time, preferably 1 bit cell time—20 nanoseconds. The one-shot pulse means within the delay line each output a short pulse as each one shot means sees the 20 nanosecond pulse signal (preferably bit cell divided by 2—10 nanoseconds). The output 10-nanosecond pulses of each of the one-shot pulse means within the delay line are transmitted directly to the OR-gate means for combining into a clock signal.

For a 4B5B encoded signal, a total of six one-shot pulse means are included within the delay line.

In the preferred environment, each of the one-shot pulse means includes the delay means, along the first path, for delaying an input signal by an amount T; an inverter means, along a second path, for inverting said input signal; and a NOR-gate means for OR'ing and inverting signals received along the first and second paths, thereby yielding a high signal having a single pulse of width T corresponding to each rising edge in the input signal. Also, preferably, the pulse stretching means includes: a delay means, along a first path, for delaying an input signal by an amount T; a second path for transmitting the signal; and an OR-gate means for OR'ing signals received along the first and second paths, thereby yielding a high signal having a single pulse having a width of twice T. The entire separator is configured in silicon using conventional CMOS techniques.

The pulse stretching means is provided to expand the 10-nanosecond pulses to 20-nanosecond pulses to ensure that the pulse travels the entire length of the delay line. It is has been found that discrete pulses having a width of about 10 nanoseconds are significantly diminished by each delay element such that the pulse is not transmitted down a delay line having more than three or four delay elements.

In accordance with alternative embodiments, additional sets of one-shot pulse means are connected to the delay line to allow for the extraction of clock signals offset from the main clock signal. In this manner, clock signals offset by 5, 10, and 15 nanoseconds are effectively generated using the same delay line. One or more offset clocks are desirable to ensure that the data may be sampled within the middle of the most narrow symbol received; which for example is the clock delayed by 5 nanoseconds if the most narrow symbol received is the high symbol with pulse width of 10 nanoseconds; if the most narrow symbol received is a low symbol with pulse width of 10 nanoseconds, then the clock delayed by 15 nanoseconds is used to sample the data. This avoids sampling the data on its edges. Sampling the data at the rising or falling edges may result in metastability problems if a D flip-flop is employed for sampling the data.

Preferably, each delay element delays an input signal by 10 nanoseconds. The delay elements are comprised of a set of cascaded inverters connected to the phase lock loop of a frequency multiplier. Such frequency multipliers are typically required for high speed data communications systems to generate the transmit data clock (50 MHz clock for 50 Mbaud 4B5B encoded data) from a 25 MHz crystal. Hence, the invention exploits the use of the frequency multiplier to allow creation of precise 10-nanosecond delays using few additional elements.

By exploiting the fact that duty cycle distortion does not affect the time between the successive rising edges in a data/clock packet, the invention allows for the extraction of a precise clock signal despite duty cycle distortion. Further, by employing a pulse stretching means, the delay line separator enables the use of a long line of delay elements for extracting delayed clock signals while a non-stretched pulse may be too narrow to be successfully transmitted down a long line of delay elements.

The delay line separator of the invention is appropriate for short distance differential point-to-point interconnect such as 100 megabits at 15 meters, 200 megabits at 10 meters, or 400 megabits at 5 meters over 26 gauge shielded twisted pair at signal amplitudes as low as 300 mv peak-to-peak as in IEEE 1394 or for single ended communications between chips on a back plane or PC board. In these systems, timing distortions due to intersymbol interference and noise are minimal and the dominant signal distortion is duty cycle distortion.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

A delay line separator architecture is disclosed. In the following description for purpose of explanation, numerous details are set forth to provide a thorough understanding of the present invention. However, it will be apparent to one skilled in the art that these details are not required in order to practice the present invention. In other instances, well known structures and circuits are shown in block diagram form in order not to obscure fundamental aspects of the invention.

Figure 1:
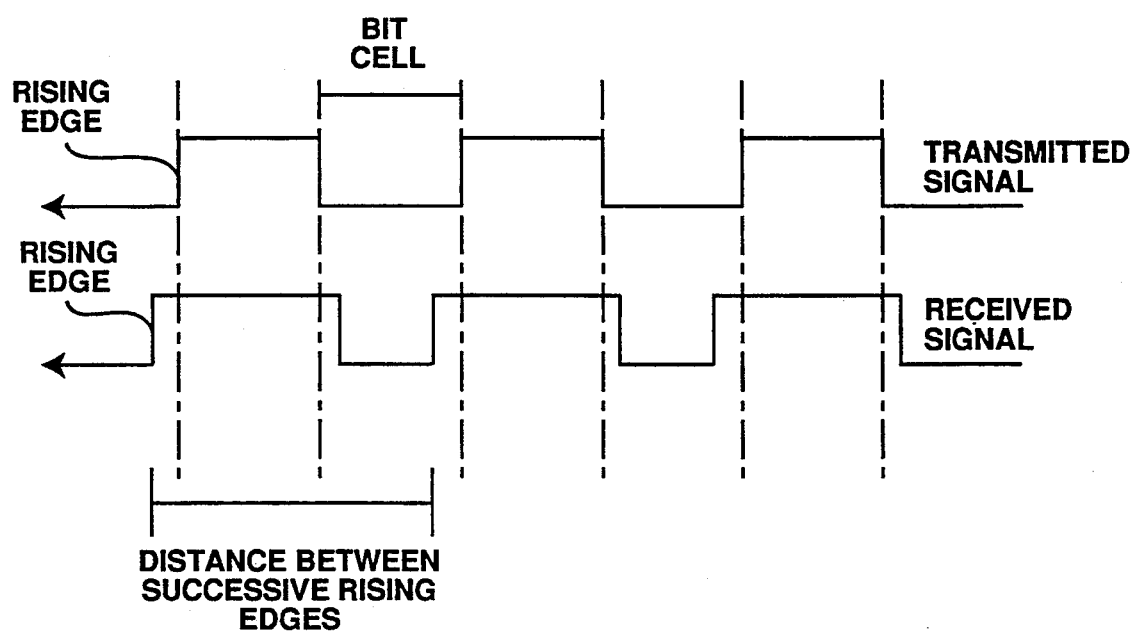
FIG. 1 is a graphical representation of a serial data bus transmission signal and a resulting received signal in the presence of duty cycle distortion.
Figure 2:
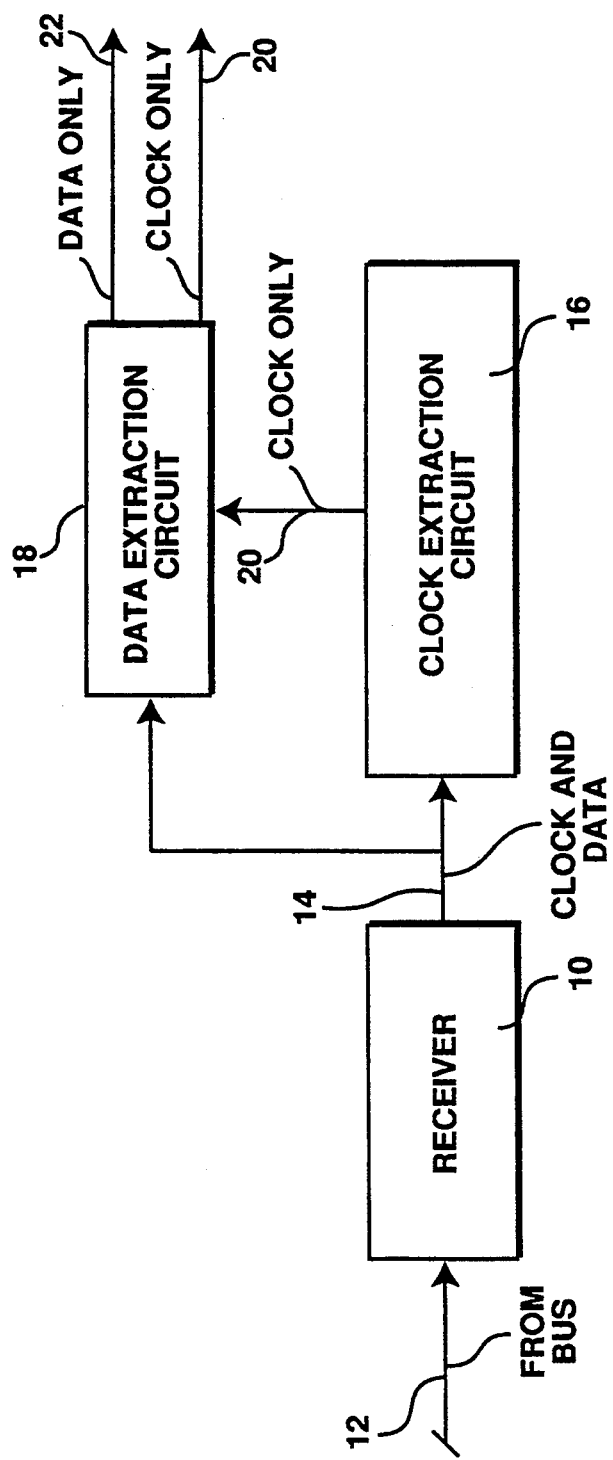
FIG. 2 provides a block diagram of a serial data bus receiver.

Referring to FIGS. 2-6, a preferred embodiment of the invention will now be described. FIG. 2 provides an overview of a backplane data bus receiving module for receiving a combined clock/data signal and for extracting the data component from the signal. The module includes a receiver unit 10 connected to a bus line 12. Receiver 10 receives combined clock/data signals over serial bus 12 from a data bus transmitter (not shown). The combined clock/data signal is output from receiver 10 along data line 14 to both a clock extraction circuit 16 and a data extraction circuit 18. Clock extraction circuit 16 processes the combined clock/data packets to isolate a clock signal within the packet for transmission to data extraction circuit 18 along clock line 20. Data extraction circuit 18 uses the clock signal received along clock line 20 to sample the combined clock/data packets received along data line 14 to extract the data from the combined signal. The resulting extracted data is output along with clock line 20 to a computer module (not shown). Serial bus line 12, receiver 10, and data extraction circuit 18, as well as data lines 14, 20, and 22, may be entirely conventional and will not be described in further detail herein. Clock extraction circuit 16, which incorporates the delay line separator of the invention, will now be described in further detail below with reference to the remaining figures.

Figure 3:
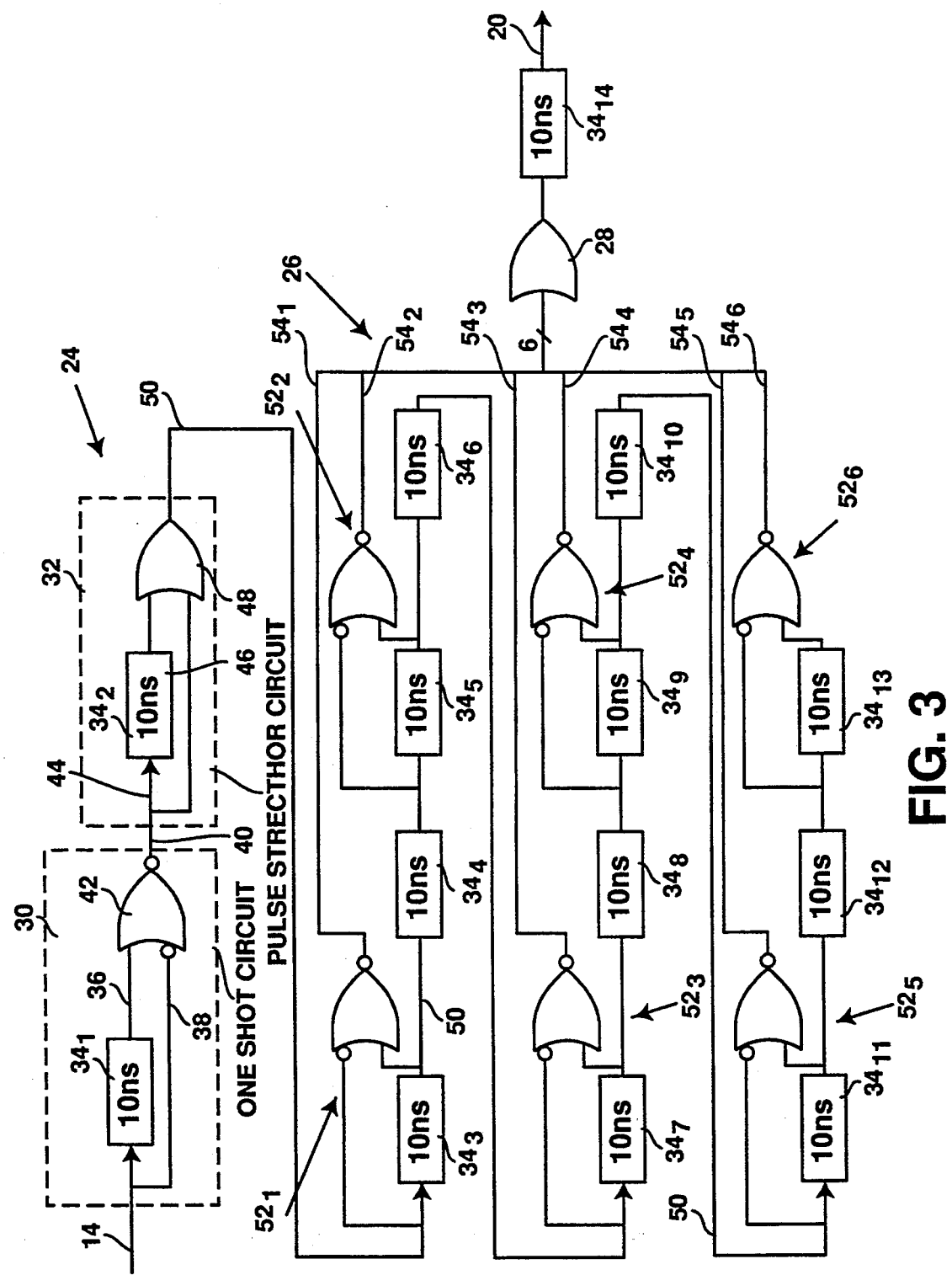
FIG. 3 is a logic block diagram of a delay line separator constructed in accordance with a preferred embodiment of the invention.
Figure 4:
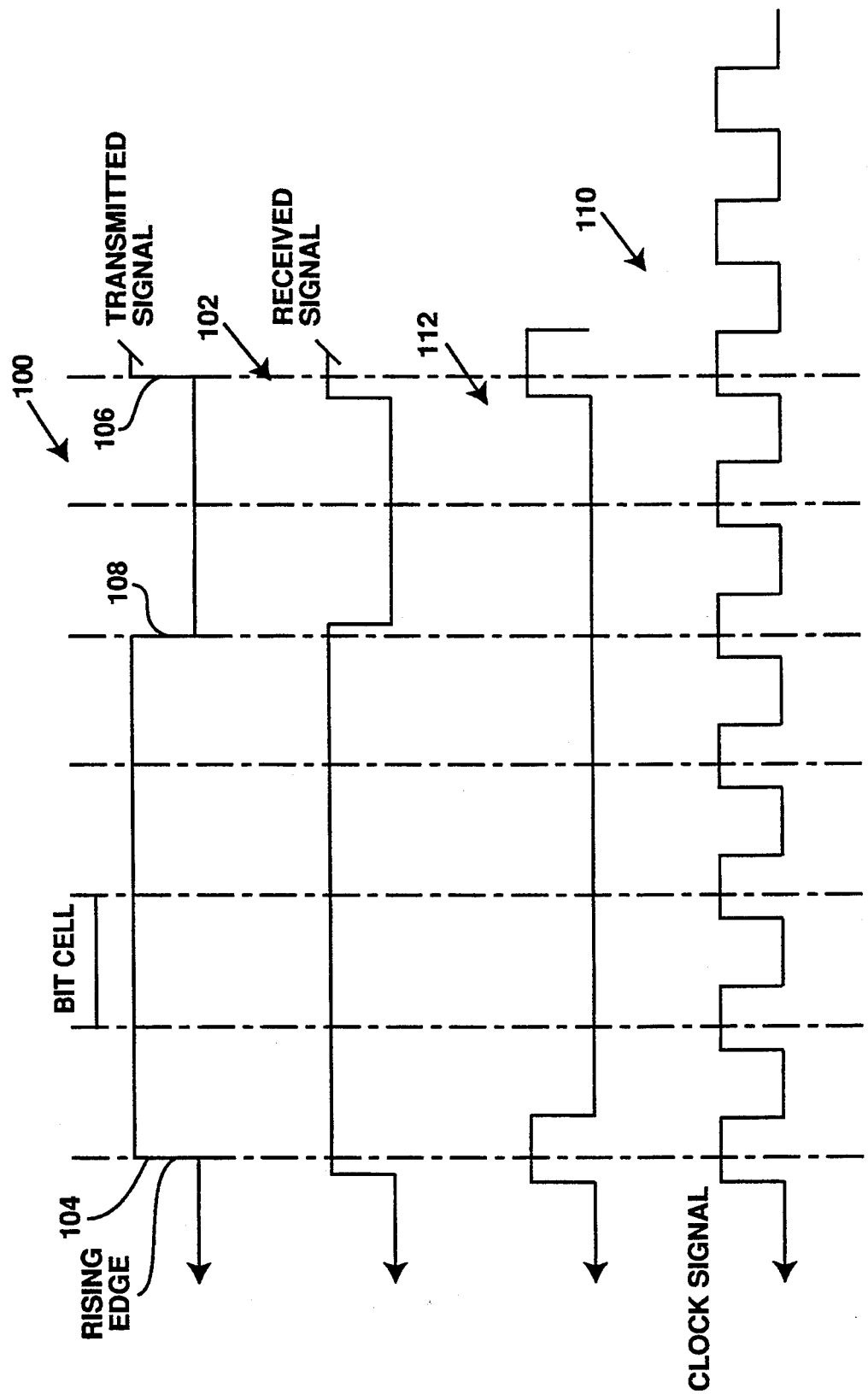
FIG. 4 is a graphical representation of an IEEE Standard 4B5B data packet, a set of intermediate pulse signals, and a resulting clock signal.

Pertinent portions of the clock extraction circuit 16 are set forth in a logic diagram in FIG. 3. The clock extraction circuit includes a pre-filter 24, a delay line 26, and an OR gate 28. Broadly, pre-filter 24 receives the combined data/clock packet along data line 14 and generates a discrete pulse for each rising edge in the data packet. The discrete pulses are transmitted along delay line 26 which outputs delayed versions of the discrete pulses to OR gate 28 for combining into an output clock signal along data line 20. Hence, pre-filter 24, delay line 26, and OR gate 28 combine to extract a clock signal from a combined data/clock packet. These components are capable of extracting a clock signal from a wide variety of standard encoded data/clock packets, such as IEEE Standard 4B5B, 8B10B, etc. However, for exemplary purposes, only the processing of 4B5B data packets will be described in detail. An exemplary 4B5B data packet is illustrated in FIG. 4, and represented by reference numeral 100. In accordance with conventional techniques, 4B5B data packets include 4 bits of information within 5 binary symbols. With a 40 megabit data rate, each bit cell has a width of 20 nanoseconds. Ideally, each symbol occupies one and only one bit cell. However, during transmission, duty cycle distortion may broaden or narrow the symbols such that individual symbols do not occupy only a single bit cell. An example of a received signal, subject to duty cycle distortion, is represented by reference number 102 in FIG. 4. As can be seen from FIG. 4, the rising edges of the data packet are advanced whereas the single trailing edge shown is delayed. As discussed above, duty cycle distortion affects only the time between a rising edge and a succeeding falling edge, and does not affect the time between successive rising edges between successive falling edges. In FIG. 4, a pair of successive rising edges are represented by reference numerals 104 and 106, with a single trailing edge referenced by numeral 108. Rising edges 104 and 106 are both advanced by an equal amount, approximately 2 to 3 nanoseconds. Trailing edge 108 is delayed by about 2 to 3 nanoseconds. Typically, trailing edges are delayed (advanced) while rising edges are advanced (delayed) by an equal amount. Nevertheless, the time between successive rising edges is unaffected, and the time between successive falling edges is unaffected. In general, the time between transitions of like types in the received signal are preserved in the presence of duty cycle distortion. Clock extraction circuit 16 exploits this unique attribute of duty cycle distortion to generate a constant frequency clock signal 110.

The manner by which clock extraction circuit 16 processes received data packet 102 to generate clock signal 110 will now be described with continued reference to FIG. 3. Pre-filter 24 of clock extraction circuit 16 includes a one-shot circuit 30 and a pulse stretchor circuit 32, each of which includes a single delay element, generally denoted 34. Each delay element 34 generates a precise timing delay of 10 nanoseconds.

One-shot circuit 30 uses the 10-nanosecond delay to generate a 10-nanosecond pulse corresponding to each rising edge in input signal packet 102. To this end, one-shot circuit 30 includes two transmission paths, an upper path 36, which includes the delay element $34_1$, and a lower path 38, which is not delayed. The data packet transmitted along both paths 36 and 38 are combined into a single output path 40 by an inverted NOR gate 42. Thus, the data packet is delayed along path 36 and inverted along path 38 such that once the signals are combined using the NOR gate, the output signal includes 10-nanosecond pulses with rising edges of the pulses synchronized with rising edges of the received data packet 102. The resulting 10-nanosecond pulses output along data line 40 are represented in FIG. 4 by pulse train 112.

The 10-nanosecond pulses output from one-shot circuit 30 along line 20 are expanded to 20-nanosecond pulses by pulse stretchor circuit 32. Pulse stretchor circuit 32, like one-shot circuit 30, includes upper and lower paths 44 and 46, respectively. The 10-nanosecond pulses transmitted along upper path 44 are delayed 10 nanoseconds by delay element $34_2$. An OR gate 48 combines the pulses received along lines 44 and 46 to yield a pulse having a width of 20 nanoseconds. The resulting pulse train of 20-nanosecond pulses is represented by reference numeral 114 in FIG. 5. As can be seen, each 20-nanosecond expanded pulse includes a rising edge corresponding to a rising edge of received pulse train 102. 20-nanosecond pulse train 114 is transmitted to delay line 26 via data line 50. Hence, delay line 26 receives a pulse train having 20-nanosecond pulses corresponding to each rising edge of the received signal.

Delay line 26 includes 13 delay elements 34 connected in series along path 50. Alternating delay elements include a one-shot circuit, denoted $52_1$, $52_2$, $52_3$ ..., $52_6$, respectively. Each one-shot circuit of delay line 26 differs slightly from one-shot circuit 30 of pre-filter 24, by providing two output paths, rather than a single output path. The additional output path is used to transmit "one-shot" 10-nanosecond pulses directly to OR gate 28.

Considering delay line 26 in greater detail, a first one-shot $52_1$ receives 20-nanosecond pulse train 114 along path 50 and generates a 10-nanosecond pulse corresponding to each rising edge in the 20-nanosecond pulse train. The manner by which 10-nanosecond pulses are created is exactly the same as described above with reference to one-shot circuit 30. Accordingly, the function of each individual one-shot circuit within delay line 26 will not be described in further detail. Each 10-nanosecond pulse generated by circuit $52_1$ is output along line $54_1$ to OR gate 28. The pulse train output along line $54_1$ is represented in FIG. 5 by $X_1$.

Hence, a pulse train having 10-nanosecond pulses corresponding to each rising edge in the received signal is transmitted along line $54_1$ to OR gate 28. However, the first one-shot $52_1$ also outputs a 20-nanosecond pulse along path 50 to second delay element $34_4$. Hence, delay element $34_4$ receives the 20-nanosecond pulse train 114, delayed by 10 nanoseconds. Delay element $34_4$ further delays pulse train 114 by an additional 10 nanoseconds such that second one-shot circuit $52_2$ receives pulse train 114 delayed by a total of 20 nanoseconds. One-shot circuit $52_2$ operates identically to one-shot circuit $52_1$ and creates 10-nanosecond pulses corresponding to each rising edge of the pulse train received along data line 50 and outputs the 10-nanosecond pulses along line $54_2$ to OR gate 28. However, because pulse train 114 received along line 50 is delayed by 20 nanoseconds prior to entering one-shot circuit $52_2$, the resulting 10-nanosecond pulses output along line $54_2$ are likewise delayed by 20 nanoseconds.

Figure 5:
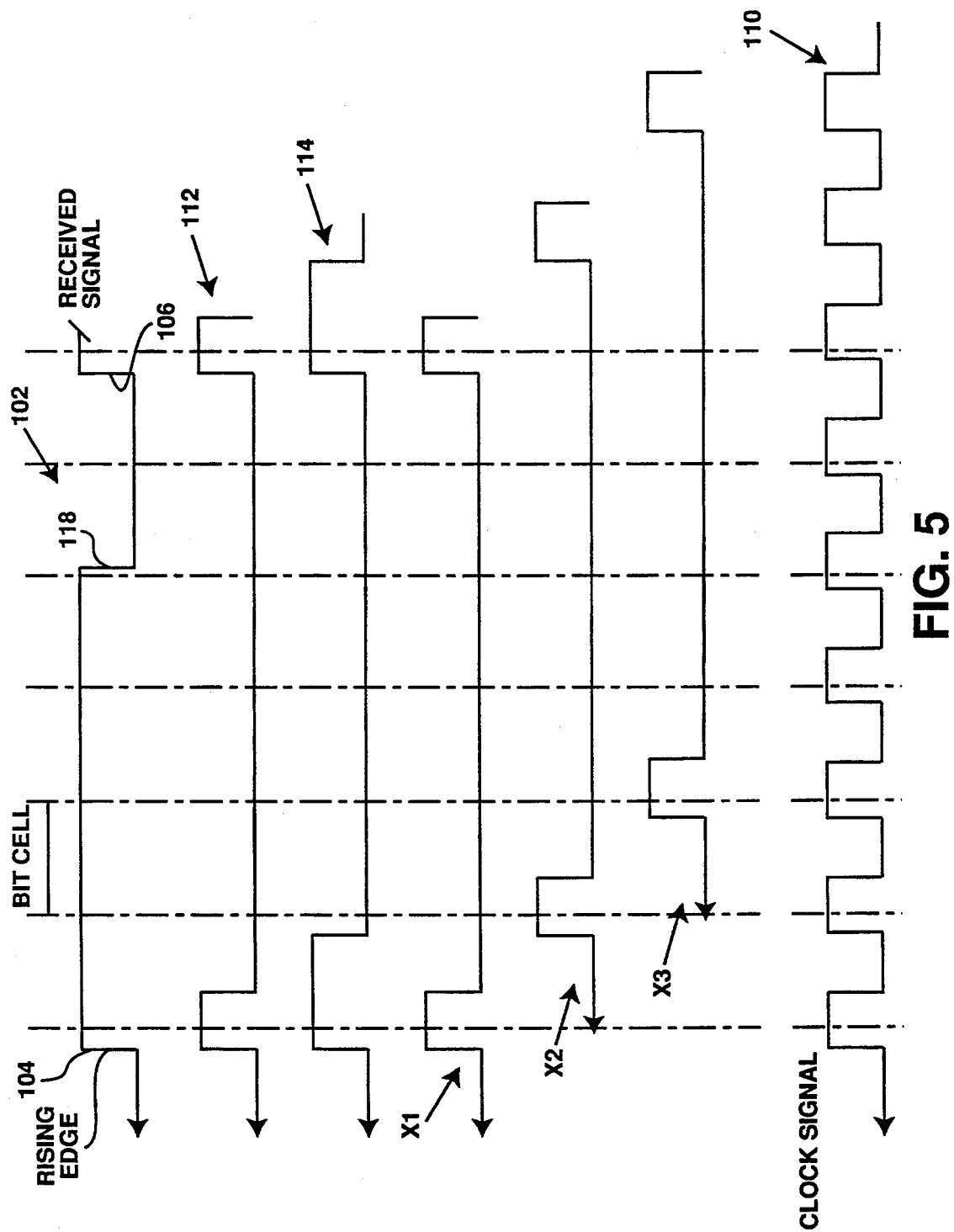
FIG. 5 is a graphical illustration of a sequence of pulse trains generated by a delay line of the delay line separator of FIG. 3.

One-shot circuit $52_3$ receives pulse train 114 delayed by a total of 40 nanoseconds and outputs a train of 10-nanosecond pulses along line $54_3$, represented in FIG. 5 by pulse train $X_3$. One-shot circuits 524, 525, and 526 also output 10-nanosecond pulse trains, each delayed by an additional 20 nanoseconds. As a result, OR gate 28 receives a total of six pulse trains, $X_1$, $X_2$, ... $X_6$, each of which includes 10-nanosecond pulses, corresponding to rising edges in received signal 102 but delayed by 0, 20 nanoseconds, 40 nanoseconds, ... 100 nanoseconds, respectively. Or-gate 28 combines pulse trains $X_1$, $X_2$, ... $X_6$, into a single clock signal 110.

Clock signal 110 is output along line 20 to data extraction circuit 18 (FIG. 2) for use in sampling received signal 102 to extract data therefrom. As shown, data extraction circuit 18 preferably includes an additional 10-nanosecond delay element 3414 for delaying clock signal 110 an additional 10 nanoseconds to ensure that received signal 102 is sampled at the middle of each bit cell rather than at the beginning or end of the bit cell. An attempt to sample a data signal at rising or falling edges of symbols within the signal may result in metastability problems resulting in degraded performance. Delaying clock signal 110, such that rising edges of pulses within the clock signal occur at about the middle of each symbol within the combined data/clock signal, substantially obviates this problem.

In summary, clock extraction circuit 16 includes a pre-filter 24 which generates 20-nanosecond pulses corresponding to each rising edge within a received combined data/clock signal. The 20-nanosecond pulses are transmitted down delay line 26 which outputs 10-nanosecond pulses corresponding to each rising edge in the 20-nanosecond pulse train, with successive elements of the delay lines "seeing" the 20-nanosecond pulse train delayed by incremental amounts. Or-gate 28 combines the 10-nanosecond pulses output from the various elements of delay line 26 to produce a clock signal having 10-nanosecond pulses.

A total of six one-shot circuits are included within delay line 26 to ensure that any 4B5B packet of data may be successively processed to generate a clock signal. Six one-shot circuits are required because, under 4B5B encoding, a maximum of six bit cells may pass between successive rising edges. However, given the actual data encoded within the packet, the rising edges may occur more frequently. Hence, the 4B5B data packet illustrated in FIG. 4 represents a "worst case" having successive rising edges separated by a maximum amount. With fewer than six one-shot circuits in delay line 26, a clock signal generated from the 4B5B packet of FIG. 4 would include gaps. Generally, delay line 26 must be configured with at least as many one-shot circuits as there are bit cells between successive like transitions in an input combined data/clock signal. Thus, for an encoding scheme wherein only a maximum of four bit cells are transmitted between successive rising edges, delay line 26 requires only four one-shot circuits. 4B5B data encoding has been illustrated herein as it represents an encoding scheme with a relatively large number of bit cells between successive transitions of like types. For data bus receivers dedicated to receiving data encoded with other encoding schemes, delay line 26 may be configured with fewer total delay elements, as needed. On the other hand, for a data bus receiver designed for receiving data encoded with schemes having a greater number of bit cells between successive transitions of like types, delay line 26 must be configured with a greater number of total delay elements.

The system thus far described generates a clock having 10-nanosecond pulses in response to received data having a bit cell with 20 nanoseconds. Pulse stretchor circuit 32 is provided to generate an interim pulse train having 20-nanosecond width pulses. This is required as it has been found that pulses of only 10 nanoseconds in width do not successfully propagate through a long delay line. Thus, without pulse stretchor circuit 32, delay line 26 would receive 10-nanosecond pulses directly from one-shot circuit 30. 10-nanosecond pulses are significantly affected by delay elements causing a dispersion of the pulses. The significant dispersion caused by each delay element within delay line 26 prevents 10-nanosecond pulses from propagating the entire length of delay line 26. Indeed, it has been found that 10-nanosecond pulses do not propagate beyond more than three or four delay elements. 20-nanosecond pulses, however, are substantially unaffected by dispersion within each delay element, thereby allowing the 20-nanosecond pulses to propagate along the entire length of delay line 26, i.e., through twelve or more delay elements. Likewise, if delay elements are employed which provide 10-nanosecond delays without significant dispersion, such that 10-nanosecond pulses can propagate through the entire delay line, then pulse stretchor circuit 32 may not be required. On the other hand, if 5-nanosecond delay elements are employed, rather than 10-nanosecond delay elements, then pulse stretchor circuit 32 is preferably modified to provide a four times expansion of each 5-nanosecond pulse to yield 20-nanosecond pulses. Alternatively, a pair of two pulse stretchor circuits could be employed in series. Thus, a wide variety of specific configurations can be employed consistent with the principles of the invention. Generally, the 20-nanosecond pulses are referred to as "soliton" pulses as they behave in a manner similar to a conventional soliton signal.

Consistent with the invention, a variety of differing pulse widths may be selected, and a variety of differing delay elements may be used, to process desired input signals. However, choices of the delay line parameters are subject to a few constraints. First, the width of the 20-nanosecond soliton pulse should not be increased substantially beyond the bit cell width of the input signal. Thus, the soliton pulse width is dependent upon the data rate of the input signal. Second, the 10-nanosecond pulses, defined by the amount of delay in each delay element, should not be greater than a minimum possible time between successive transitions within the input signal. In other words, if an input signal having a 20-nanosecond bit cell is distorted to the point where the time between a falling edge and an immediately following rising edge is less than 10 nanoseconds, then a delay line utilizing 10-nanosecond delay elements may not be effective. In such circumstances, either the delay elements must be reconfigured to provide a shorter delay, thus generating shorter pulses, or the data bus transmission line must be configured to ensure at least a minimum spacing between transitions of 10 nanoseconds. Hence, this requirement can be satisfied by defining the parameters of the serial data bus system to ensure that no more than a predetermined amount of duty cycle distortion occurs during transmission. This may be achieved by limiting the length of the serial database line to, for example, 2 to 3 meters. Those skilled in the art will recognize that actual system limitations depend on a large number of factors including the quality of the serial bus line. The separator of the invention can be exploited in transmission systems covering 20 or 30 meters or more, if a suitable serial data bus line is chosen having a minimal amount of distortion.

Figure 6:
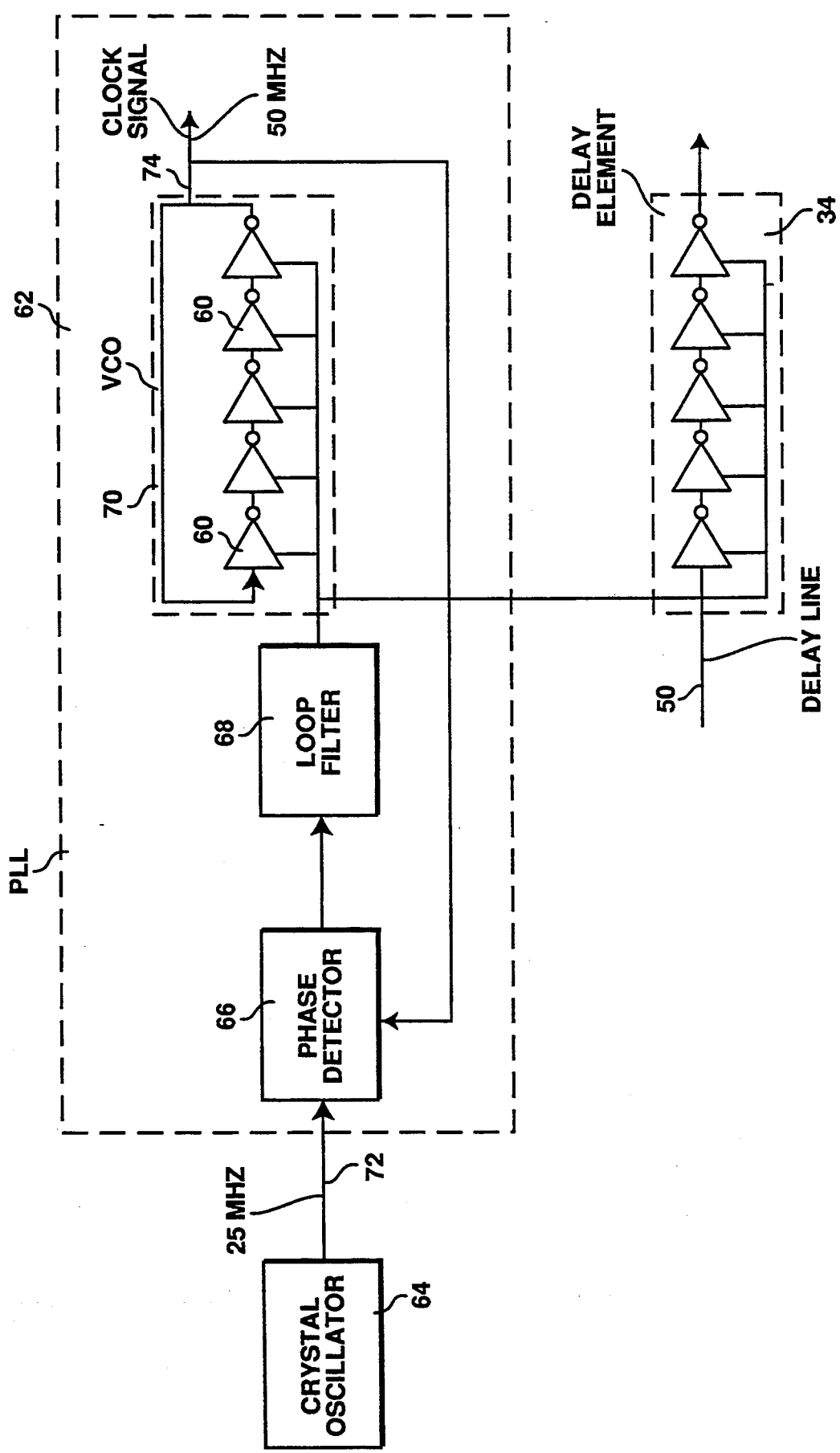
FIG. 6 is a logic block diagram illustrating an individual delay element employed in the delay line separator of FIG. 3.

FIG. 6 provides a schematic illustration of a single exemplary delay element. Delay element 34 includes a set of five cascaded inverters 60 connected in a series to soliton transmission path 50 and coupled into a phase lock loop (PLL) 62. PLL 62 operates as a frequency multiplier for converting a 25 megahertz clock signal generated by a crystal oscillator 64 to a 50 megahertz signal, suitable for processing 50 megabaud data rates. In accordance with conventional frequency multiplier techniques, PLL 62 includes a phase detector 66, a loop filter 68, and a voltage control oscillator (VCO) 70 connected in a feedback loop. PLL 62 receives the 25 megahertz clock signal from crystal oscillator 64 along an input line 72 and outputs a 50 megahertz clock signal along output line 74. VCO 70 preferably comprises a cascaded set of inverters, identical to the inverters of delay element 34. However, whereas the cascaded inverters of VCO 70 are in a closed loop of the PLL, the cascaded inverters of delay line 34 are merely in an open loop along transmission line 50. The output of loop filter 68 controls the frequency of VCO 70 and likewise controls the delay of the cascaded inverters of delay line 34. For PLL 62 to convert a 25 megahertz signal to a 50 megahertz signal, the cascaded inverters of VCO 70 must provide a 10-nanosecond delay.

By forming a replica of the cascaded inverters of VCO 70 along data line 50, the replica inverters likewise generate a 10-nanosecond delay for a 50 MHz signal. Accordingly, each delay element within clock extraction circuit 16 (FIG. 2) may be formed from a set of replica inverters connected into the PLL of a frequency multiplier. This represents an efficient technique for generating 10-nanosecond delays since frequency multipliers are almost always required on a high speed serial data bus chip. Hence, minimal additional circuitry is required on the chip. Rather, the only additional circuitry required are replicas of the cascaded inverters of the voltage controlled oscillator of the frequency multiplier. Hence, the delay element of FIG. 6 provides a particularly efficient technique for generating precise delays for use with the delay line separator of the invention. However, other delay elements can be used in the alternative.

Figure 7:
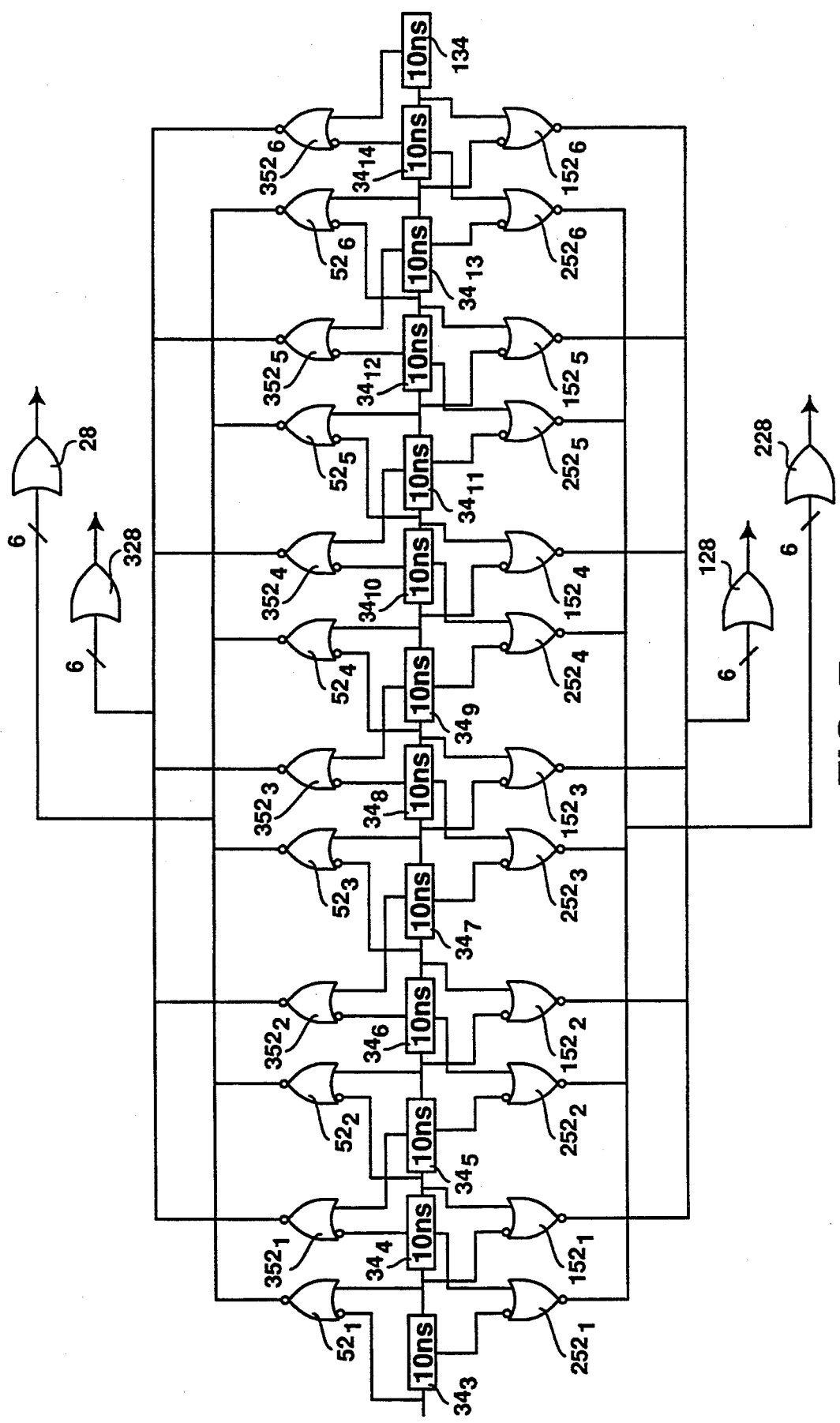
FIG. 7 is a logic block diagram showing an alternative embodiment of the delay line separator of FIG. 3, including additional sets of logic elements for extracting delayed clock signals.

Thus far described, the delay line separator of the invention generates a single 10-nanosecond clock in response to an input signal having combined clock/data information, despite the presence of duty cycle distortion. In FIG. 7 an alternative embodiment of the delay line separator is represented which generates additional clock signals by mounting additional sets of one-shot circuits to the delay elements of the delay line. The delay line separator of FIG. 7 generates the same 10-nanosecond clock of the separators of FIG. 2, but additionally generates 10-nanosecond clock signals delayed by 5 nanoseconds, 10 nanoseconds, and 15 nanoseconds respectively. To generate the three additional clock signals, the separator of FIG. 7 includes three additional sets of one-shot circuits mounted within delay line 26. The first additional set of one-shot circuits, represented by reference numerals $152_1$, $152_2$, ..., $152_6$, are connected to preferably the second, fourth, sixth, etc. delay elements of the delay line. Thus, whereas the first set of one-shot circuits 52 are mounted to the first, third, fifth, etc. elements for providing an undelayed clock signal, the second set of one-shot circuits each "sees" the soliton pulse signal delayed by an additional 10 nanoseconds, thus generating a clock signal delayed by 10 nanoseconds.

Third and fourth sets of one-shot circuits, denoted 252 and 352 respectively, are connected into 5-nanosecond output terminals of the delay elements. By incorporating an additional 5-nanosecond delay, the third and fourth sets of one-shot circuits generate clock signals delayed by 5 and 15 nanoseconds, respectively. To properly generate a clock signal delayed by 15 nanoseconds, an additional thirteenth delay element, 134 is required. Each additional set of one-shot circuits is connected to an additional OR gate, identical to OR gate 28 of FIG. 3, but denoted 128, 228 and 348, respectively.

Hence, the delay line separator of FIG. 7 provides a total of four clock signals. The additional clock signals delayed by 5, 10, and 15 nanoseconds respectively are utilized by data extraction circuit 18 (FIG. 2) or by other computer components, not shown. By providing a 10-nanosecond delayed clock signal, the additional delay element of FIG. 2, provided to prevent metastability problems, is not required. Rather, the combined data/clock signal is sampled using the 10-nanosecond delayed clock signal, rather than the undelayed clock signal, thereby avoiding metastability problems.

To generate an additional 5-nanosecond output from each of the delay elements, the delay elements are configured similar to the element shown in FIG. 6, but in fully differential form with an even number of inverters.

Figure 8:
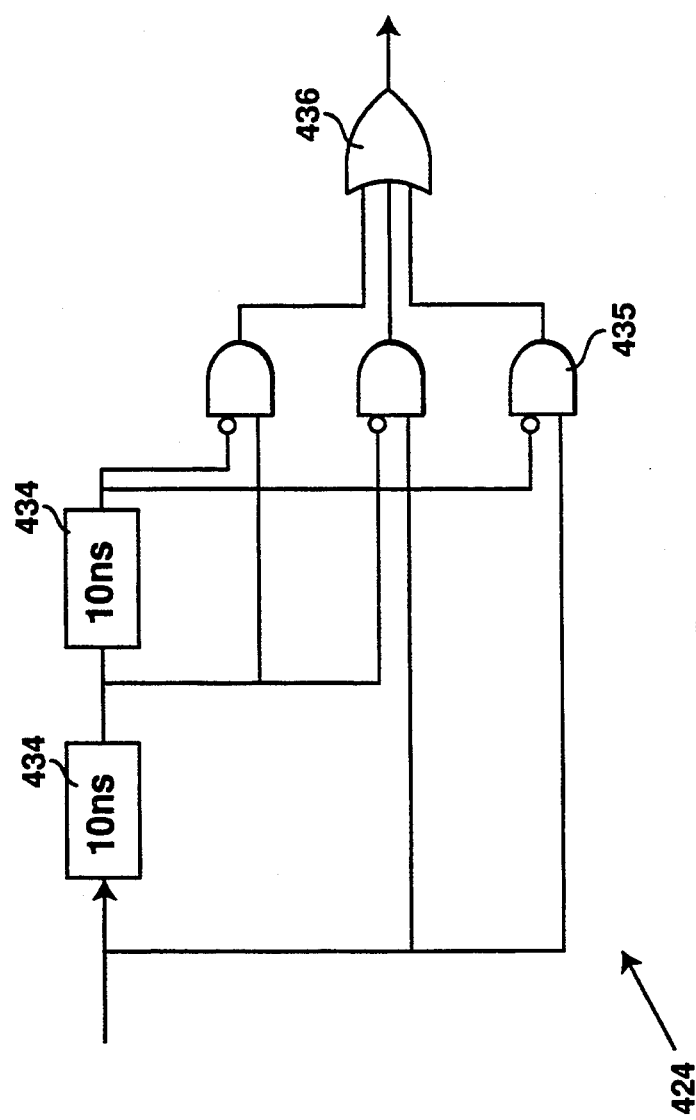
FIG. 8 is a logic block diagram illustrating an alternative embodiment of the one-shot circuit and the pulse stretchor circuit components of FIG. 3.

Referring to FIG. 8, an alternative embodiment to pre-filter 24 of FIG. 3 will now be described. Pre-filter 424 of FIG. 8 includes a pair of delay elements 434 and three AND gates 435 connected, in the configuration shown, to the outputs of the delay elements. Each AND-gate includes one inverted input line and one uninverted input line. Signal outputs from the AND-gates are combined using a three-way OR gate element 436 to yield an output signal having 20-nanosecond pulses synchronized with each rising edge of an input signal. Hence, the circuit of FIG. 8 provides the same function as the pre-filter of FIG. 3. Other electrical circuit configurations which generate 20-nanosecond pulses synchronized with the rising edges of an input signal may also be used in the alternative. The two configurations provided herein are preferred due to their simplicity.

What has been described is a delay line separator for extracting a clock signal from an encoded clock/data signal achieved along a serial data bus line. The separator employs a delay line of precise delay elements to generate individual pulses which are combined using OR gates into one or more clock signals. The separator is preferably fabricated in silicon using conventional CMOS fabrication techniques. Those skilled in the art will appreciate that the logic diagrams provided herein do not include all circuit elements that may be necessary in an operative separator system. Moreover, although the examples described herein utilize single ended circuits, the delay line separators of the invention can also be implemented using fully differential circuits.

The delay line separator is highly useful for extracting a clock signal from short bursts of high data rate encoded signals. The separator is almost entirely open loop, such that it does not suffer from problems inherent in closed loop separators such as PLL-based separators. In particular, the above-described delay line separator generates a clock signal without losing the initial bit cells of a data block. Moreover, the separator generates an accurate usable clock signal despite the presence of substantial duty cycle distortion which may significantly increase or decrease within the received data block. The separator achieves these results using a limited number of electrical components which can be easily and inexpensively fabricated in silicon.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A delay line separator for extracting a clock signal from a combined clock/data signal received along a serial data line, said combined clock/data signal including pulses each bounded by a signal level transition of a first type and a signal level transition of a second type, said separator comprising:
   a one-shot pulse means, connected to said serial data line, for generating a pulse signal having individual pulses corresponding to all transitions of said first type within said data signal;
   a pulse stretching means for increasing the width of said pulses within said pulse signal; and
   a delay line means for generating a clock signal from said pulse signal having pulses of increased width, said clock signal being synchronized with said transitions of said first type within said data signal.

2. The delay line separator of claim 1, wherein said transitions of said first type are rising edge signal level transitions and said transitions of said second type are falling edge signal level transitions.

3. The delay line separator of claim 1, wherein said transitions of said first type are falling edge signal level transitions and said transitions of said second type are rising edge signal level transitions.

4. The delay line separator of claim 1, wherein said delay line means includes:
   a plurality of additional one-shot pulse means, sequentially connected to said pulse stretching means, for successively receiving said pulse signal having pulses of increased width and for generating additional pulses corresponding to said transitions of said first type in said pulse signal, with each of said additional one-shot pulse means including a delay means for delaying said pulse signal by a preselected amount; and
   OR-gate means, connected to each of said additional one-shot pulse means, for combining output pulses from each of said additional one-shot pulse means to yield the clock signal.

5. The delay line separator of claim 4, wherein said combined clock/data signal includes a plurality of sequential bit cells with said combined clock/data signal encoded subject to an encoding scheme which ensures at least two transitions of like types within no more than a predefined number N of bit cells and wherein said delay line includes N one-shot pulse means.

6. The delay line separator of claim 5, wherein said combined signal is encoded with IEEE Standard 4B5B encoding and wherein said delay line includes at least six of said one-shot pulse means.

7. The delay line separator of claim 4, wherein each of said delay means of said delay line provides a delay of approximately 10 nanoseconds, said pulses of said pulse signal have a width of approximately 10 nanoseconds, and said pulse stretchor increases said pulse width to approximately 20 nanoseconds.

8. A delay line separator for extracting a clock signal from a combined clock/data signal received along a serial data line, said combined clock/data signal including a plurality of sequential bit cells having a predefined width (W), said data being encoded subject to an encoding scheme which ensures at least two rising-edge transitions within no more than a predefined number (N) of bit cells, said separator comprising:
  a one-shot pulse means, connected to said serial data line, for generating a pulse signal having an individual pulse corresponding to each rising edge within said data signal;
  a pulse stretching means for increasing the width of said pulses within said pulse signal to a width approximately equal to said bit cell width W;
  at least N additional one-shot pulse means, sequentially connected to said pulse stretching means, for successively receiving said pulse signal having pulses of increased width and for generating additional pulses corresponding to rising edges in said pulse signal, with each of said additional one-shot pulse means including a delay means for delaying said pulse signal by amount of time T; and
  OR-gate means, connected to each of said additional one-shot pulse means, for combining output pulses from each of said additional one-shot pulse means to yield a single clock signal, said clock signal including pulses having a width of W/2.

9. The delay line separator of claim 8, wherein said combined clock/data signal is encoded according to 4B5B protocol.

10. The delay line separator of claim 8, wherein said bit cell width W is 20 nanoseconds.

11. The delay line separator of claim 8, wherein each of said delay means of said at least N additional one shot means provide a delay of approximately 10 nanoseconds.

12. The delay line separator of claim 9, wherein N is 6.

13. The delay line separator of claim 8, wherein each of said one-shot pulse means comprises:
  a delay means, along a first path, for delaying an output signal from the pulse stretching means by an amount of time T;
  an inverter means, along a second path, for inverting said output signal from the pulse stretching means; and
  a NOR-gate means for combining and inverting signals received along said first and second paths, thereby yielding a signal having a single pulse of width T corresponding to each rising edge in said input signal.

14. The delay line separator of claim 8, wherein said pulse stretching means comprises:
  a delay means, along a first path, for delaying an output signal from the pulse stretching means by an amount of time T;
  a second path for transmitting said output signal from said pulse stretching means; and
  an OR-gate means for combining signals received along said first and second paths, thereby yielding a signal having a single pulse with a pulse-width of approximately twice T.

15. The delay line separator of claim 8, further including a frequency multiplier circuit connected to a crystal oscillator for receiving a clock signal output from said crystal oscillator, said frequency multiplier including phase-lock loop having, in a continuous loop, a phase detector receiving the clock signal from said crystal oscillator, a loop filter receiving output of the phase detector, and a voltage controlled oscillator receiving an output of the loop filter, and wherein each of said delay means comprises a set of cascaded inverters connected in series to an output of a previous delay means and to an output of said pulse stretching means, with clock inputs of said invertors connected, in parallel, to an output of said loop filter of said phase-lock loop.

16. The delay line separator of claim 8, further including means for generating delayed clock signals.

17. The delay line separator of claim 16, wherein said delay elements provide a delayed pulse, delayed by an amount T, along a front output, wherein said delay elements additionally output a signal delayed by T/2 output from a second output of said delay element, and wherein said means for generating delayed clock signals comprises:
  a second set of one-shot means, each respectively, connected to one of said delay elements of said first set of one shot means, said second set receiving said signals delayed by T/2 from respective second outputs of said delay elements; and
  a second OR-gate means, connected to each of said additional one-shot pulse means, for combining output pulses from each of said additional one-shot pulse means to yield a second clock signal, said second clock signal including pulses having a width of W/2, said pulses being delayed by T/2 from said clock signal of said first set of one-shot pulse means.

18. A delay line separator for extracting a clock signal from a combined data/clock signal received along a serial data line, said combined data/clock signal including a plurality of sequential bit cells having a predefined width (W), with selected bit cells being separated by signal level transitions, said signal level transitions being of two types, said data being encoded subject to an encoding scheme which ensures that at least two transitions of like type occur within no more than a predefined number (N) of bit cells, and wherein said combined clock/data signal is influenced by distortion which affects the time between successive transitions of differing types but does not affect the time between successive transitions of like types, said separator comprising:
  a first one-shot pulse means, connected to said serial data line, for generating a pulse signal having an individual pulse corresponding to each transition of a pre-determined type within said combined clock/data signal;
  at least N additional one-shot pulse means, sequentially connected to said first one-shot pulse means, for receiving said pulse signal and for generating additional pulses corresponding to each pulse in said pulse signal, with each of said additional one-shot pulse means including a delay means for delaying said pulse signal by an amount equal to said bit cell width W; and OR-gate means, connected to each of said additional one-shot pulse means, for combining output pulses from each of said additional one-shot pulse means to yield a single clock signal, said clock signal including pulses having a width of W/2.

19. A method for extracting a clock signal from a combined clock/data signal received along a serial data line, said combined clock/data signal including pulses each bounded by a signal level transition of a first type and a signal level transition of a second type, said method comprising the steps of:

generating a pulse signal having an individual pulse corresponding to each transition of said first type within said combined clock/data signal;

increasing the width of said individual pulses within said pulse signal; and generating a clock signal from said pulse signal having pulses of increased width, said clock signal being synchronized with said transitions of said first type within said data signal.

20. The method of claim 19, wherein said transitions of said first type are rising edge signal level transitions and said transitions of said second type are falling edge signal level transitions.

21. The method of claim 19, wherein said transitions of said first type are falling edge signal level transitions and said transitions of said second type are rising edge signal level transitions.

22. The method of claim 19 wherein said step of generating a clock signal includes the steps of:

sequentially generating additional pulses corresponding to said transitions of said first type in said pulse signal having pulses of increased width, with each of said additional pulses being successively delayed by a preselected amount; and combining said additional pulses to yield the clock signal.

23. The method of claim 22, wherein said combined clock/data signal includes a plurality of sequential bit cells with said combined clock/data signal encoded subject to an encoding scheme which ensures at least two transitions of like types within no more than a predefined number N of bit cells and wherein said step of generating additional pulses is applied to generate N additional pulses.

24. The method of claim 23, wherein said combined signal is encoded with IEEE Standard 4B5B encoding and wherein N is greater than or equal to six.

25. The method of claim 22, wherein said pulses are delayed by approximately 10 nanoseconds, said pulses of said pulse signal have a width of approximately 10 nanoseconds, and said pulses of said pulse signal are increased to a width of approximately 20 nanoseconds.

26. A method for extracting a clock signal from a combined clock/data signal received along a serial data line, said combined clock/data signal including a plurality of sequential bit cells having a predefined width (W), said data being encoded subject to an encoding scheme which ensures at least two rising-edge transitions within no more than a predefined number (N) of bit cells, said method comprising the steps of:

generating a pulse signal having an individual pulse corresponding to each rising edge within said data signal;

increasing the width of said pulses within said pulse signal to a width approximately equal to said bit cell width W;

sequentially generating additional pulses corresponding to rising edges in said pulse signal of increased width, with each of said additional pulses being successively delayed by an amount of time T;

combining said successively delayed pulses to yield a single clock signal, said clock signal including pulses having a width of W/2.

27. The method of claim 26, wherein said input data signal is encoded according to 4B5B protocol.

28. The method of claim 26, wherein said bit cell width W is 20 nanoseconds.

29. The method of claim 26, wherein said delay elements of said additional one shot means provide a delay of approximately 10 nanoseconds.

30. The method of claim 27, wherein N is 6.

31. The method of claim 26, wherein said step of sequentially generating additional pulses comprises the steps of:

delaying said pulse signal having pulses of increased width by an amount of time T to produce a first signal;

inverting said pulse signal having pulses of increased width to produce a second signal; and combining and inverting said first and second signals to yield a signal having a single pulse of width T corresponding to each rising edge in said input signal.

32. The method of claim 26, wherein said step of increasing the width of said pulses in said pulse signal comprises the steps of:

delaying said pulse signal having pulses of increased width by an amount of time T to produce a first signal;

combining said pulse signal having pulses of increased width and said first signal to yield a signal having a single pulse with a pulse width of approximately twice T.

33. A delay line separator for extracting a dock signal from a combined clock/data signal received along a serial data line, said combined clock/data signal including pulses bounded by signal level transitions of first and second types, said separator comprising:

a one-shot pulse circuit, connected to said serial data line, generating a pulse signal having individual pulses corresponding to all transitions of said first type within said data signal;

a pulse stretching circuit, connected to the one-shot pulse circuit, increasing the width of said pulses within said pulse signal; and a delay line circuit, connected to the pulse stretching circuit, generating a clock signal from said pulse signal having pulses of increased width, said clock signal being synchronized with said transitions of said first type within said data signal.

34. The delay line separator of claim 33, wherein said transitions of said first type are rising edge signal level transitions and said transitions of said second type are falling edge signal level transitions.

35. The delay line separator of claim 33, wherein said transitions of said first type are falling edge signal level transitions and said transitions of said second type are rising edge signal level transitions.

36. The delay line separator of claim 33, wherein said delay line circuit includes:
- a plurality of additional one-shot pulse circuits, sequentially connected to said pulse stretching circuit, successively receiving said pulse signal having pulses of increased width and generating additional pulses corresponding to said transitions of said first type in said pulse signal, with each of said additional one-shot pulse circuits including a delay circuit delaying said pulse signal by a preselected amount; and
- an OR-gate circuit, connected to each of said additional one-shot pulse circuits, combining output pulses from each of said additional one-shot pulse circuits to yield the clock signal.

37. The delay line separator of claim 36, wherein said combined clock/data signal includes a plurality of sequential bit cells with said combined clock/data signal encoded subject to an encoding scheme which ensures at least two transitions of like types within no more than a predefined number N of bit cells and wherein said delay line includes N one-shot pulse circuits.

38. The delay line separator of claim 37, wherein said combined signal is encoded with IEEE Standard 4B5B encoding and wherein said delay line includes at least six of said one-shot pulse circuit.

39. The delay line separator of claim 36, wherein each of said delay circuits of said delay line provides a delay of approximately 10 nanoseconds, said pulses of said pulse signal have a width of approximately 10 nanoseconds, and said pulse stretchor increases said pulse width to approximately 20 nanoseconds.

40. A delay line separator for extracting a clock signal from a combined clock/data signal received along a serial data line, said combined clock/data signal including a plurality of sequential bit cells having a predefined width (W), said data being encoded subject to an encoding scheme which ensures at least two rising-edge transitions within no more than a predefined number (N) of bit cells, said separator comprising:
- a one-shot pulse circuit, connected to said serial data line, generating a pulse signal having an individual pulse corresponding to each rising edge within said data signal;
- a pulse stretching circuit increasing the width of said pulses within said pulse signal to a width approximately equal to said bit cell width W;
- at least N additional one-shot pulse circuits, sequentially connected to said pulse stretching circuit, successively receiving said pulse signal having pulses of increased width and generating additional pulses corresponding to rising edges in said pulse signal, with each of said additional one-shot pulse circuits including a delay circuit delaying said pulse signal by amount of time T; and
- an OR-gate circuit, connected to each of said additional one-shot pulse circuits, combining output pulses from each of said additional one-shot pulse circuit to yield a single clock signal, said clock signal including pulses having a width of W/2.

41. The delay line separator of claim 40, wherein said input data signal is encoded according to 4B5B protocol.

42. The delay line separator of claim 41, wherein N is 6.

43. The delay line separator of claim 40, wherein said bit cell width W is 20 nanoseconds.

44. The delay line separator of claim 40, wherein each of said delay circuit of said at least N additional one shot circuit provide a delay of approximately 10 nanoseconds.

45. The delay line separator of claim 40, wherein each of said one-shot pulse circuits comprises:
- a delay circuit, along a first path, delaying an output signal from the pulse stretching circuit by an amount of time T;
- an inverter circuit, along a second path, inverting said output signal from the pulse stretching circuit; and
- a NOR-gate circuit combining and inverting signals received along said first and second paths, thereby yielding a signal having a single pulse of width T corresponding to each rising edge in said input signal.

46. The delay line separator of claim 40, wherein said pulse stretching circuit comprises:
- a delay circuit, along a first path, delaying an output signal from the pulse stretching circuit by an amount of time T;
- a second path transmitting said output signal from said pulse stretching circuit; and
- an OR-gate circuit combining signals received along said first and second paths, thereby yielding a signal having a single pulse with a pulse-width of approximately twice T.

47. The delay line separator of claim 40, further including a frequency multiplier circuit connected to a crystal oscillator receiving a clock signal output from said crystal oscillator, said frequency multiplier including phase-lock loop having, in a continuous loop, a phase detector receiving the clock signal from said crystal oscillator, a loop filter receiving output of the phase detector, and a voltage controlled oscillator receiving an output of the loop filter, and wherein each of said delay circuits comprises a set of cascaded inverters connected in series to an output of a previous delay circuit and to an output of said pulse stretching circuit, with clock inputs of said invertors connected, in parallel, to an output of said loop filter of said phase-lock loop.

48. The delay line separator of claim 40, further including a circuit generating delayed clock signals.

49. The delay line separator of claim 48, wherein said delay elements provide a delayed pulse, delayed by an amount T, along a front output, wherein said delay elements additionally output a signal delayed by T/2 output from a second output of said delay element, and wherein said circuit generating delayed clock signals comprises:
- a second set of one-shot circuits, each respectively, connected to one of said delay elements of said first set of one shot circuits, said second set receiving said signals delayed by T/2 from respective second outputs of said delay elements; and
- a second OR-gate circuit, connected to each of said additional one-shot pulse circuits, combining output pulses from each of said additional one-shot pulse circuits to yield a second clock signal, said second clock signal including pulses having a width of W/2, said pulses being delayed by T/2 from said clock signal of said first set of one-shot pulse circuits.

* * * * *

UNITED STATES PATENT AND TRADEMARK OFFICE
CERTIFICATE OF CORRECTION

PATENT NO. : 5,412,697
DATED      : May 2, 1995
INVENTOR(S) : Van Brunt et al

It is certified that error appears in the above-indentified patent and that said Letters Patent is hereby corrected as shown below:

In column 16, line 44, delete "dock" and insert --clock--.

Signed and Sealed this

Fourteenth Day of October, 1997

Attest:

BRUCE LEHMAN

Attesting Officer          Commissioner of Patents and Trademarks